United States Patent
Deobald et al.

(10) Patent No.: US 8,540,833 B2
(45) Date of Patent: Sep. 24, 2013

(54) REINFORCED STIFFENERS AND METHOD FOR MAKING THE SAME

(75) Inventors: Lyle R. Deobald, Shoreline, WA (US); John D. Morris, Seattle, WA (US); Karl B. Lee, Kirkland, WA (US); Jeffery L. Marcoe, Bellevue, WA (US); Mark C. Iden, Burien, WA (US); Christopher G. Harris, Auburn, WA (US)

(73) Assignee: The Boeing Company, Chicago, IL (US)

( * ) Notice: Subject to any disclaimer, the term of this patent is extended or adjusted under 35 U.S.C. 154(b) by 325 days.

(21) Appl. No.: 12/122,124

(22) Filed: May 16, 2008

(65) Prior Publication Data

US 2009/0317587 A1 Dec. 24, 2009

(51) Int. Cl.
*D04H 3/00* (2012.01)
*B29B 11/16* (2006.01)

(52) U.S. Cl.
USPC ........... 156/180; 156/181; 156/245; 156/292; 156/293; 264/241; 264/271.1; 428/61

(58) Field of Classification Search
USPC ............. 156/180, 121, 196, 200, 201, 202, 156/216, 228, 242, 245, 292, 311, 324, 438, 156/411, 463, 499, 166, 181, 293; 264/271.1, 264/275, 277; 428/61
See application file for complete search history.

(56) References Cited

U.S. PATENT DOCUMENTS

| | | | |
|---|---|---|---|
| 3,025,208 A * | 3/1962 | Geiger | 156/382 |
| 3,071,217 A * | 1/1963 | Gould | 52/403.1 |
| 3,578,544 A * | 5/1971 | Thorsrud | 428/113 |
| 4,109,435 A * | 8/1978 | Loyd | 52/309.1 |
| 4,113,910 A * | 9/1978 | Loyd | 428/162 |
| 4,151,031 A * | 4/1979 | Goad et al. | 156/201 |
| 4,206,895 A * | 6/1980 | Olez | 244/123.3 |
| 4,256,790 A * | 3/1981 | Lackman et al. | 428/73 |
| 4,331,495 A * | 5/1982 | Lackman et al. | 156/93 |
| 4,331,723 A | 5/1982 | Hamm | |
| 4,715,560 A * | 12/1987 | Loyek | 244/117 R |
| 4,783,228 A * | 11/1988 | Aker et al. | 156/64 |
| 4,811,540 A * | 3/1989 | Kallies et al. | 52/630 |
| 4,966,802 A * | 10/1990 | Hertzberg | 428/119 |
| 5,026,595 A | 6/1991 | Crawford, Jr. et al. | |

(Continued)

FOREIGN PATENT DOCUMENTS

EP 2006074 A1 12/2008
WO 0222440 A1 3/2002

(Continued)

OTHER PUBLICATIONS

International Search Report and Written Opinion, dated Nov. 11, 2009, regarding Application No. PCT/US2009/044042 (WO2009140555), 13 pages.

*Primary Examiner* — Katarzyna Wyrozebski Lee
*Assistant Examiner* — Scott W Dodds
(74) *Attorney, Agent, or Firm* — Yee & Associates, P.C.

(57) ABSTRACT

A composite stiffener is fabricated using preforms of laminated, unidirectional composite tape. The stiffener includes a void that is reinforced by a filler wrapped with a structural adhesive. The surfaces of the preforms surrounding the void include a layer of composite fabric which is bonded to the filler by the adhesive, thereby increasing the toughness of stiffeners around the void and improving pull-off strength of the stiffener.

15 Claims, 7 Drawing Sheets

(56) References Cited

U.S. PATENT DOCUMENTS

| | | | |
|---|---|---|---|
| 5,556,565 A * | 9/1996 | Kirkwood et al. | 219/633 |
| 5,562,436 A * | 10/1996 | Kawahara et al. | 418/55.5 |
| 5,639,535 A * | 6/1997 | McCarville | 428/119 |
| 5,716,487 A * | 2/1998 | Sumerak | 156/359 |
| 5,833,786 A * | 11/1998 | McCarville et al. | 156/92 |
| 5,842,317 A * | 12/1998 | Pettit | 52/514 |
| 6,562,436 B2 * | 5/2003 | George et al. | 428/105 |
| 6,592,795 B2 * | 7/2003 | Kasai et al. | 264/241 |
| 6,648,273 B2 * | 11/2003 | Anast | 244/119 |
| 6,689,448 B2 * | 2/2004 | George et al. | 428/105 |
| 6,709,538 B2 * | 3/2004 | George et al. | 156/73.3 |
| 7,052,572 B2 * | 5/2006 | Miura et al. | 156/286 |
| 7,080,805 B2 * | 7/2006 | Prichard et al. | 244/117 R |
| 7,087,317 B2 * | 8/2006 | Ehrstrom et al. | 428/650 |
| 7,134,629 B2 * | 11/2006 | Johnson et al. | 244/119 |
| 7,159,822 B2 * | 1/2007 | Grantham et al. | 244/119 |
| 2003/0175520 A1 * | 9/2003 | Grutta et al. | 428/411.1 |
| 2007/0095475 A1 * | 5/2007 | Hable et al. | 156/330 |
| 2009/0044042 A1 * | 2/2009 | Fujiwara et al. | 714/3 |

FOREIGN PATENT DOCUMENTS

| | | | |
|---|---|---|---|
| WO | WO2004/039670 A2 * | 5/2004 | |
| WO | WO 2007119371 A1 * | 10/2007 | |
| WO | 20090140555 A2 | 11/2009 | |

* cited by examiner

REINFORCED STIFFENERS AND METHOD FOR MAKING THE SAME

TECHNICAL FIELD

This disclosure generally relates to composite structures, and deals more particularly with techniques for reinforcing multi-piece composite stiffeners to improve their pull-off strength.

BACKGROUND

A variety of lightweight, composite beams and stiffeners may be used in vehicles such as aircraft in order to support or strengthen features such as wings and fuselage sections. For example, stiffeners having an "I" cross sectional shape may be used to stiffen wing panels forming part of a wing assembly. These lightweight I-section stiffeners may be typically formed from graphite fiber tape laminates which exhibit relatively high axial stiffness, but relatively low interlaminar toughness, particularly at the intersection of the web and the base/cap.

I-section stiffeners may be fabricated using two preformed C-channels, in which the flanges of the channel are joined to the web by a radius. Due to the radius, the intersection of the base and cap with the web form a void or "radius filler zone" in which a filler may be placed in order to reinforce the stiffener in this area. The stiffener must possess sufficient pull-off strength in the area of the radius filler zone to resist tension loads imposed on the stiffener for a given application. In order to achieve adequate pull-off strength, it may be necessary to increase the gauge of the stiffener, thereby adding weight to the aircraft. Alternatively, radius blocks may be added to the stiffeners in order to increase pull-off strength, but the radius blocks also add undesirable weight to the aircraft.

Accordingly, there is a need for a stiffener construction that exhibits improved pull-off strength in the area around the radius filler zone without materially increasing the weight of the stiffener.

SUMMARY

The disclosed embodiments provide a stiffener formed from laminated composite tape that is reinforced in the area of radius filler zones through the use of one or more layers of composite fabric and an adhesive wrapped filler. The increased toughness of the composite fabric and the adhesive wrap reinforce the stiffener, resulting in improved pull-off strength, while improving both the onset and maximum failure load. The disclosed embodiments may be employed to form reinforced stiffeners for variety of applications, including for example and without limitation, attaching ribs to stringer caps in aircraft applications.

According to one disclosed embodiment, a composite stiffener comprises: A composite stiffener, comprising: first, second and third members formed from laminated composite tape, the first and second members defining a web and a pair of flanges extending from the web, the third member being joined to the flanges and extending generally transverse to the web, the first, second and third composite members intersecting to form a void; a filler disposed in and substantially filling the void; at least one layer of composite fabric on each of the members in the area of the filler; and, a layer of adhesive surrounding the filler and joining the filler to the composite fabric. Both the composite fabric and the adhesive may extend partially up the web and along the flange in both directions to increase the toughness of the stiffener.

According to another disclosed embodiment, a composite stiffener, comprises: a pair of composite channels joined together, each of the channels including a web, flanges extending from the web, and radius areas between the web and each of the flanges; a base extending transverse to the web and joined to each of the flanges, the radius areas of the channels and the base forming at least one radius filler zone; a reinforcing member filling the radius filler zone; a layer of composite fabric covering the radius areas of the channels and the base; and, a layer of adhesive surrounding the filler and joining the filler to the composite fabric layer. In one embodiment, the composite fabric layer may include woven bidirectional reinforcing fibers which may comprise graphite. The filler may be one of: a formed unidirectional composite tape, a composite laminate, a hybrid tape-fabric member, and a titanium member. The layer of adhesive may include a sheet of structural adhesive wrapped around the filler. In one embodiment, the layer of adhesive may extend beyond the radius filler zone into interfacial layers between the channels and between the base and each of the flanges.

According to a disclosed method embodiment, fabricating a composite stiffener comprises: forming a pair of composite channels each having a flange and a radius portion, using composite fiber tape; placing a layer of composite fiber fabric over the radius portion of each of the channels; forming a base using composite fiber tape; placing a layer of composite fiber fabric over at least a portion of the base; placing a layer of adhesive around a filler; assembling the channels and the base; placing the filler and the layer of adhesive in a radius filler zone between the radius portions of the channels and the base; and, curing the assembly.

According to another method embodiment, fabricating a reinforced composite stiffener, comprises: forming a composite structure having a web and a pair of flanges extending in opposite directions from the web, including applying a layer of composite fabric over laminated composite tape plies in an area between the web and the flanges; joining a surface of the cap to the flanges; applying a layer of composite fabric to the surface of the cap joined to the flanges; placing a reinforcing filler between the web, the flanges and the cap; and, using an adhesive to join the reinforcing filler to the composite fabric layers on the composite structure and the cap.

Other features, benefits and advantages of the disclosed embodiments will become apparent from the following description of embodiments, when viewed in accordance with the attached drawings and appended claims

BRIEF DESCRIPTION OF THE ILLUSTRATIONS

DETAILED DESCRIPTION

Figure 1:
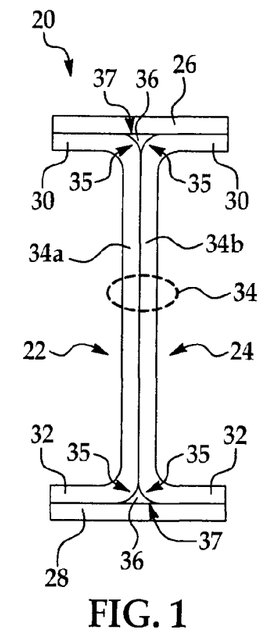
FIG. 1 is an end view of a reinforced stiffener according the disclosed embodiments.
Figure 2:
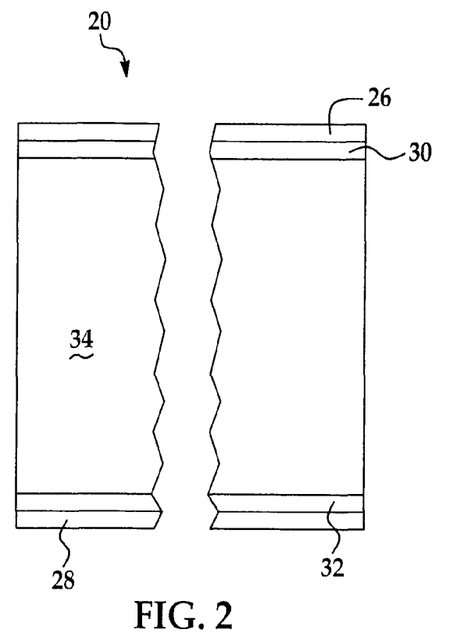
FIG. 2 is a side view of the reinforced stiffener shown in FIG. 1.
Figure 3:
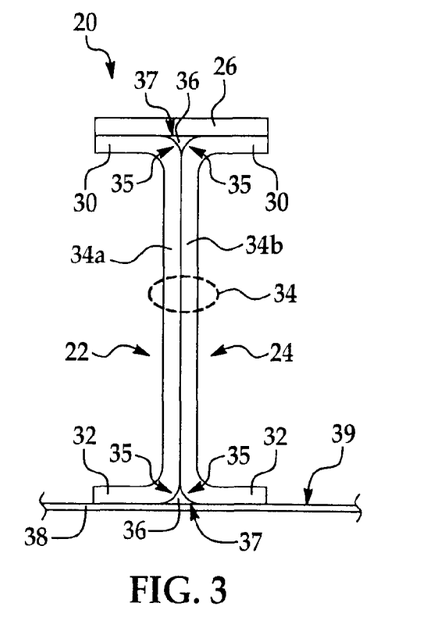
FIG. 3 is a sectional view showing a reinforced stiffener bonded to a skin.

Referring first to FIGS. 1, 2 and 3, a reinforced stiffener generally indicated by the numeral 20 has a generally I-shaped cross section and may be used in a variety of applications to carry loads and/or stiffen structural members. For example, and without limitation, in an aircraft wing, the stiffener 20 may be used to stiffen a wing panel (not shown) or other component of the wing (not shown), or to stiffen a skin 38 forming part of a fuselage section (not shown).

The stiffener 20 broadly comprises a pair of C-shaped channels 22, 24 arranged in back-to-back relationship, a cap 26, and a base 28. The C-channels 22, 24, cap 26 and base 28 may be formed of reinforced composite tape in which the reinforcing fibers are unidirectionally oriented and are held in a synthetic matrix such as, by way of example and without limitation, epoxy. The C-channels 22, 24 respectively include web portions 34a, 34b and a pair of oppositely facing flanges 30, 32 on each end of the web portions 34a, 34b. The web portions 34a, 34b are joined together to form a web 34. Each of the web portions 34a, 34b transitions to one of the flanges 30, 32 at a radius 35. The cap 26 and base 28 are joined to the outer faces of the flanges 30, 32 respectively. As a result of the radii 35, a generally triangularly shaped void 37 is created at each intersection of the radii 35 with the cap 26 and the base 28. The voids 37, which are also referred to herein as "radius filler zones", are filled with an elongate reinforcing filler 36 also known as a "noodle" that has a cross sectional shape generally matching the generally triangular cross section of the voids 37.

The fillers 36 may be fabricated from many of various materials that are compatible with the materials used in the channels 22, 24, cap 26 and base 28, but typically may comprise a composite unidirectional formed composite tape, a composite laminate, a hybrid tape-fabric member or machined titanium. The fillers 36 function to more evenly distribute and transmit loads between the web 34, the base 28 and the cap 26.

Referring particularly to FIG. 3, in some applications, an alternate form 20 of the stiffener may be used in which either the cap 26 or base 28 is formed by a structural element to which the stiffener 20 may be attached, which in the illustrated example, is a skin 38. Accordingly, in this example, the radius filler zone 37 is defined by the radii 35 and the inner face 39 of the skin 38.

Figure 4:
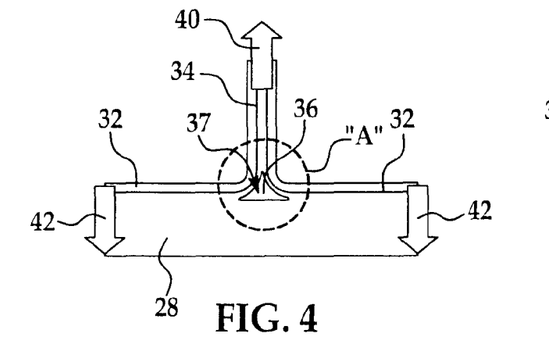
FIG. 4 is a diagram illustrating the pull-off forces acting on the stiffener shown in FIG. 1.
Figure 5:
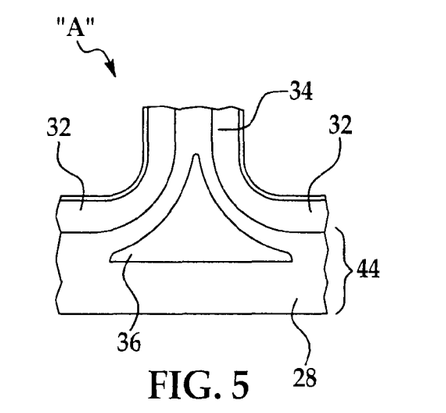
FIG. 5 is an enlarged view of the area designated as "A" in FIG. 4.

Attention is now directed to FIGS. 4 and 5 which illustrate typical tension forces acting on the stiffener 20. A tension force indicated by the arrow 40 acting through the web 34 creates a reaction force indicated by the arrows 42 which is normal to the planes of the lamina forming the flanges 32 and the base 28. Due to the presence of the radius filler zone 37, the reaction forces 42 may tend to separate or "pull-off" the lamina and the area surrounding the radius filler zone 37. It is therefore desirable that the fillers 36 assist, to the extent possible, in reinforcing the area surrounding the radius filler zone 37, thus increasing the pull-off strength of the stiffener 20.

Figure 6:
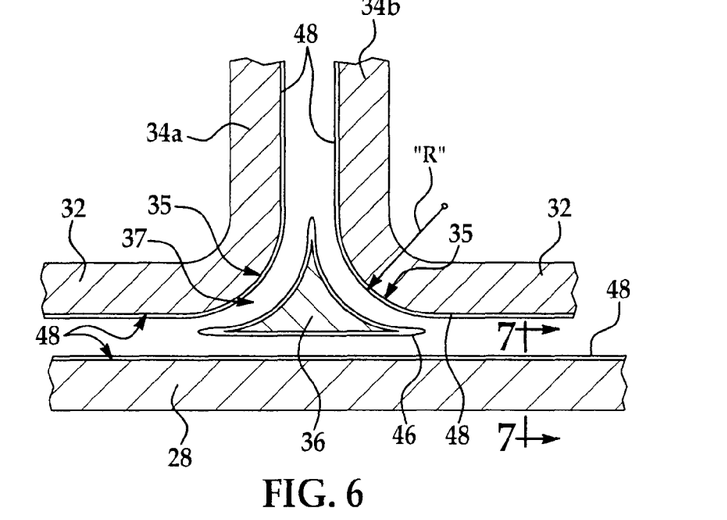
FIG. 6 is an exploded, sectional view of one end of the stiffener shown in FIG. 1.
Figure 7:
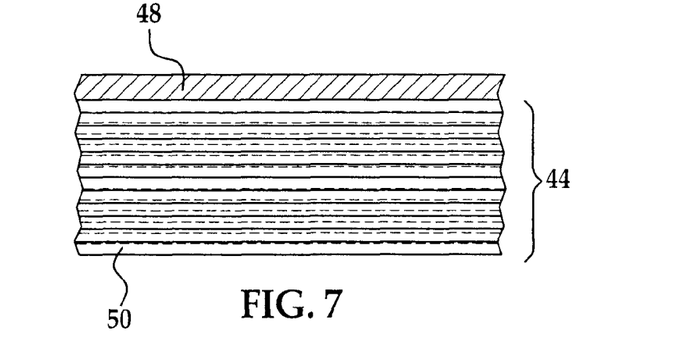
FIG. 7 is a sectional view taken along the line 7-7 in FIG. 6.
Figure 8:
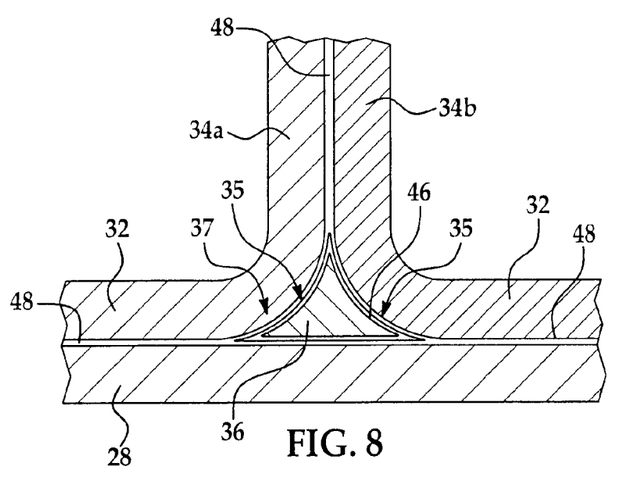
FIG. 8 is a view similar to FIG. 6 but showing the components in their assembled form.

Referring now to FIGS. 6, 7 and 8, the pull-off strength of the stiffener 20 may be increased by employing a layer of composite fabric 48 in the area of the radius filler zone 37, and by wrapping all sides of the filler 36 with a layer of adhesive 46. Although a single layer of fabric 48 may be adequate, in some applications more than one layer of the fabric 48 may be desirable or beneficial. The fabric 48 may comprise sets of woven or knitted fibers that extend traverse to each other, thereby providing axial stiffness in more than one direction, i.e., in the orientation directions of the woven or knitted fibers. In contrast, the fibers in the tape 50 forming the underlying plies 44 are oriented in a single direction and therefore may exhibit high axial stiffness only in their direction of orientation. Additionally, the layer of fabric 48 may provide additional stiffness due to the fact that the fibers in the fabric 48 have been structurally linked or intertwined together through weaving or knitting. The fabric layer 48 may comprise, for example without limitation, carbon or graphite fibers that are woven or knitted in 0-90 or +/−45 degree orientations, although other bidirectional orientations are possible. The matrix used in the fabric layer 48 may be epoxy or other suitable materials well known in the art of composite materials. The layer of adhesive 46 may comprise, for example and without limitation, an epoxy based structural adhesive. As will be discussed below in more detail, during processing, the layer of adhesive 46 may tend to "bleed" into the layer of fabric 48, thereby creating a stronger bond between the filler 36 the C-channels 22, 24 and base 28. This stronger bond increases the toughness of the stiffener 20 in the area of the radius filler zone 37, which in turn may increase the pull-off strength of the stiffener 20.

As previously indicated, the C-channels 22, 24, cap 26 and base 28 (FIGS. 1-3) are each formed from multiple plies 44 (see FIG. 7) of reinforced, unidirectional fibers in the form of tape 50. As will be discussed in more detail below, the top layer of fabric 48 may cover an entire side of the channels 22, 24, cap 26 and base 28, or may comprise a patch that is present only along a section of the length of the filler 36 in those applications where it is important to minimize the weight of the stiffener 20. The combination of the fabric layers and the layer of adhesive 46 may act to resist a path of potential delamination around the reinforcement element 36, thereby creating a tough "T" section at the opposite ends of the web 34. In some applications it may desirable to increase the radius "R" (FIG. 6) of the radii 35 in order to reduce the peak tensile force in the area of the radii 35, thereby further improving the pull-off strength of the stiffener 20.

The disclosed embodiments may be advantageously employed in the fabrication of stiffeners having cross sections other than an I, such as a T or a J, or other cross sectional geometries where a cap or base intersects radius areas forming a void requiring fillers and improvements in pull-off strength.

Figure 9:
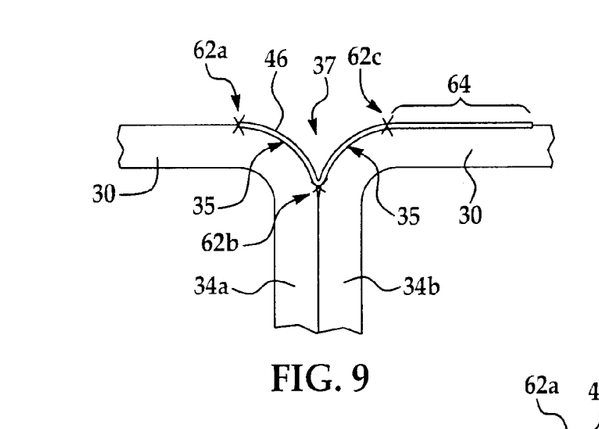
FIGS. 9-11 illustrate steps for installing an adhesive wrap and a filler in the radius filler zone of the stiffener shown in FIG. 1.
Figure 10:
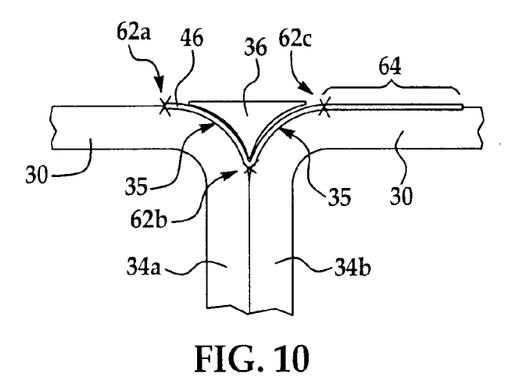
Figure 11:
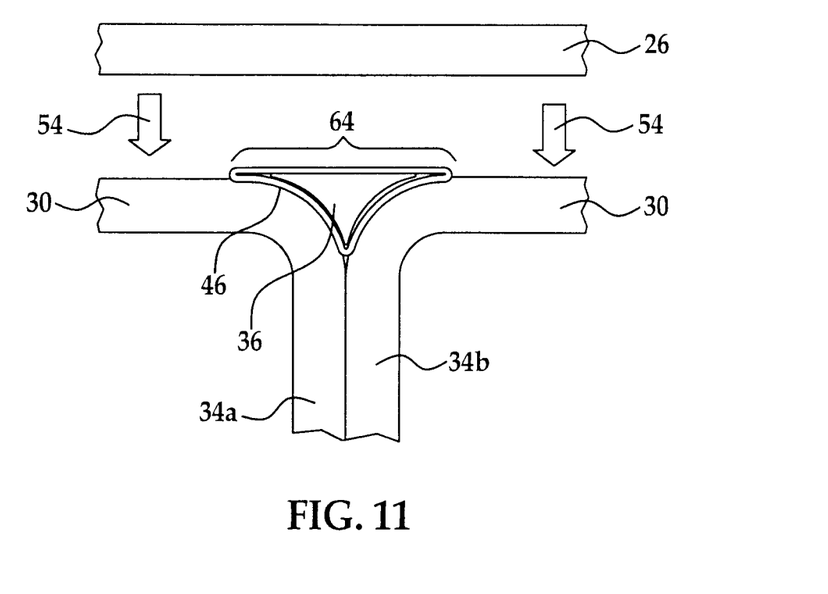

Attention is now directed to FIGS. 9-11 which illustrate a method for wrapping the filler 36 with the layer of adhesive 46 and installing the filler 36 in the radius filler area 37. As shown in FIG. 9, a layer, which may in the form a of a sheet of the layer of adhesive 46 is placed over the radius filler area 37, with one edge of the sheet of adhesive 46 beginning at a tangent point 62a on one of the flanges 30. The sheet forming the layer of adhesive 46 is then forced down into the radius filler area until it reaches another tangent point 62b, following which the remainder of the layer of adhesive 46 is draped over the other flange 32, covering a third tangent point 62c. The width of the sheet forming the layer of adhesive 46 should be sufficient such that a length 64 remains which is equal to or greater than the width of the filler 36. The remaining length 64 of the layer of adhesive 46 is folded over the filler 36, as shown in FIG. 11, and any remaining excess amount (not shown) may be cut away.

The filler 36 having been fully wrapped in the layer of adhesive 46, the cap 26 (or base 28) is then drawn in the direction of the arrows 54, into contact with the flange 30 (or 32) and filler 36 as the parts are assembled in a set of tooling (not shown) used to compress and co-cure the stiffener 20, as will be discussed in more detail below. During the cure process, the layer of adhesive 46 partially bleeds out into the fabric layers 48, creating a strong interfacial bond between the filler 36 and the C-channels 22, 24, the base 28 and cap 26. As previously indicated, in some applications, the layer 48 of composite fabric and the layer adhesive 46 may extend the entire length of the stiffener 20, whereas in other applications the fabric 48 and the layer of adhesive 46 may be present only along a section of the length of the stiffener 20 in areas, for example, where tension loads on the stiffener 20 may be particularly high.

Figure 12:
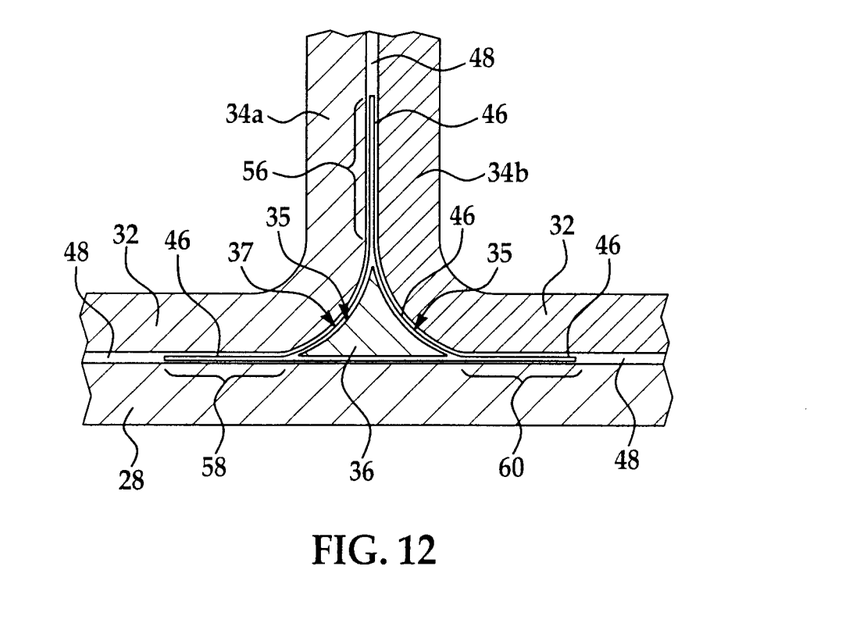
FIG. 12 is a sectional view of one end of a stiffener forming an alternate embodiment.

Referring now to FIG. 12, in some applications, it may be desirable to extend the length of the layer of adhesive 46 beyond the tangent points 62 (FIG. 9) into the direct interfacial areas 56, 58 and 60 between the C-channels 22, 24 and the base 28 (or cap 26). These extended areas of adhesive 56, 58 and 60 bond the directly facing layers 48 of fabric and may further strengthen the stiffener 20 in the radius filler area 37, thus further improving the pull-off strength.

Figure 13:
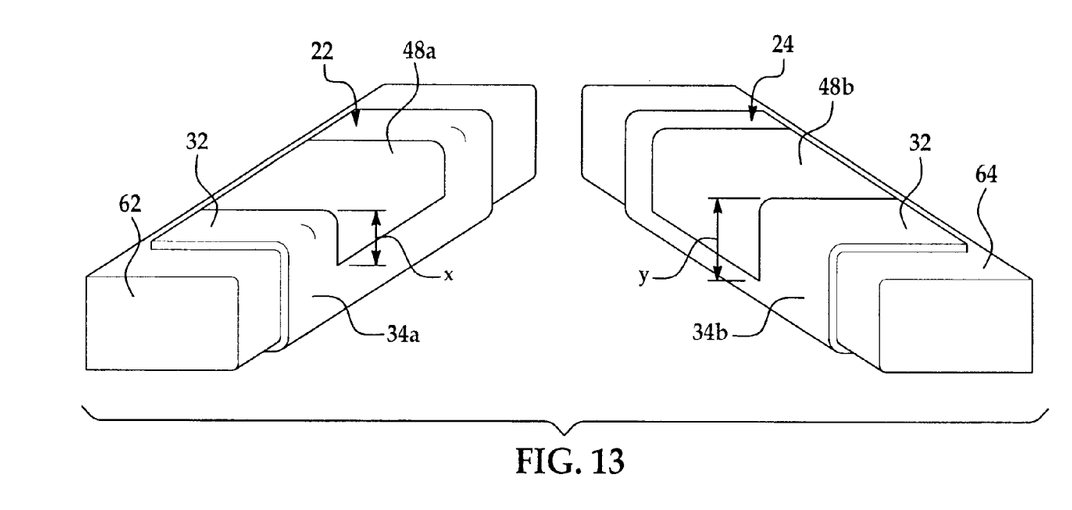
FIG. 13 is a perspective view showing tools used in applying localized fabric patches used in a method for fabricating the fastener illustrated in FIG. 1.
Figure 14:
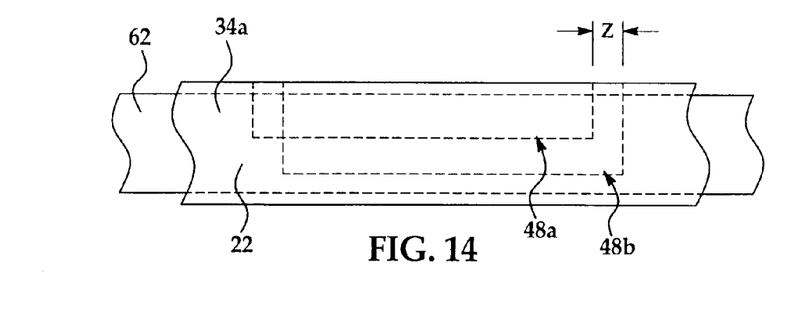
FIG. 14 is a side view of the tools shown in FIG. 14 after the tools have been pushed together.
Figure 15:
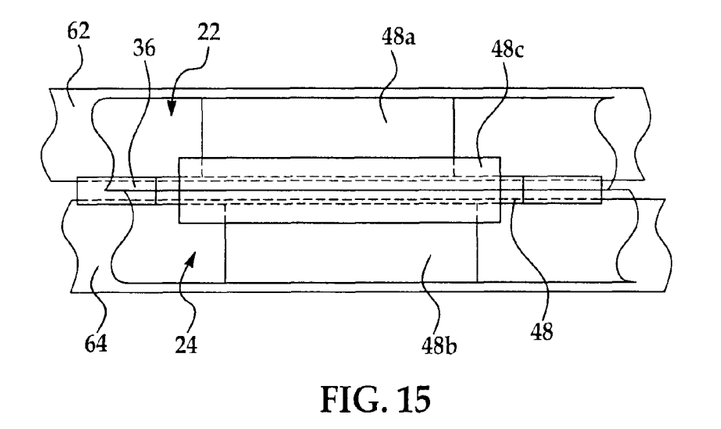
FIG. 15 is a top view of the tools shown in FIG. 14.

Reference is now made to FIGS. 13-15 which illustrate a method and related tooling that may be used to form stiffeners 20 in which the fabric layers 48 are localized, i.e. they are applied as patches. The C-channels 22, 24 may be drape formed over a pair of tools 62, 64. Composite fabric patches 48a, 48b are then respectively placed in appropriate areas over the corresponding C-channels 22, 24 as best seen in FIG. 13. In some applications, it may be desirable that the fabric patches 48a, 48b be slightly offset from each other. For example, as may be seen in FIG. 13, the depth x of patch 48a draped over web portion 34a is less than the depth y of the fabric patch 48b. Similarly, as shown in FIG. 14, patches 48a, 48b are longitudinally offset by a distance Z.

After the patches 48a, 48b have been placed over the drape formed C-channels 22, 24, the tools 62, 64 are pushed together, forcing the web portions 34a, 34b into face-to-face contact. At this point, as shown in FIG. 15, the adhesive wrapped filler 36 is placed into the radius filler zone 37, following which a third fabric patch 48c is placed over the filler 36, overlapping the fabric patches 48a, 48b. In this example, the adhesive layer 46 is wrapped around only a section of the overall length of the filler 36, however in other applications the adhesive layer 46 may extend the full length of the filler 36. Finally, the base 28 and cap 26 may be installed and the entire assembly can then be vacuum bagged and placed in an autoclave (not shown) fox compaction and curing.

Figure 16:
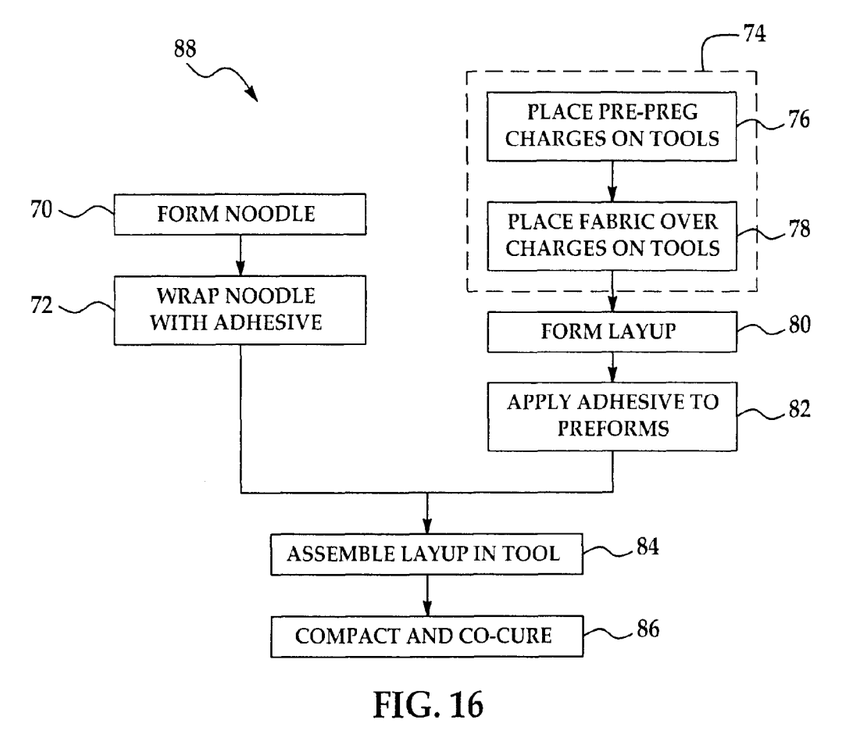
FIG. 16 is a flow diagram illustrating a method for producing the reinforced stiffener.

Attention is now directed to FIG. 16 which illustrates the steps of a method 88 for fabricating the reinforced stiffener 20. At 70, the filler 36 is formed using any of various techniques known in the art of composite processing. At 72, the filler 36 is wrapped with a layer of adhesive 46, which may be carried out by folding the layer of adhesive 46 around each side of the filler 36.

A lay-up is formed at 74 by stacking pre-preg layers of composite tape on appropriate tooling, as shown at step 76, following which, at 78, a layer of composite fabric 48 is placed over the stack of tape plies. The lay-up is then formed into the C-channels 22 or 24 using drape forming or other techniques at step 80.

Next, in those applications where the layer of adhesive 46 extends beyond the boundaries of the reinforcing element 36, an additional layer of adhesive 56, 58, 60 (see FIG. 12) may be applied to the C-channel preforms 22, 24, as shown at step 82.

Next, at step 84, the C-channel preforms 22, 24 and the adhesive wrapped filler 36 are assembled as a lay-up in appropriate tooling. Then, at 86, the lay-up is compacted and cured to complete the stiffener 20.

Figure 17:
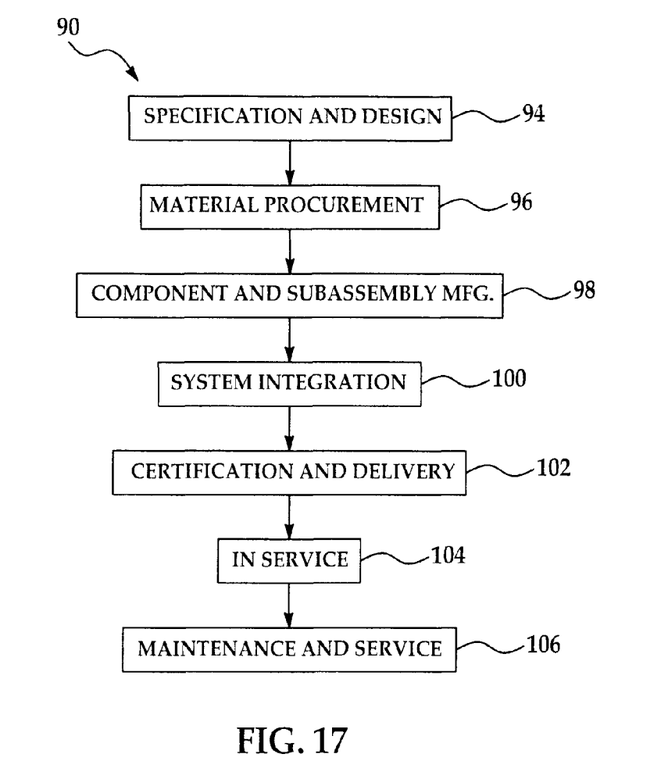
FIG. 17 is a flow diagram of aircraft production and service methodology.
Figure 18:
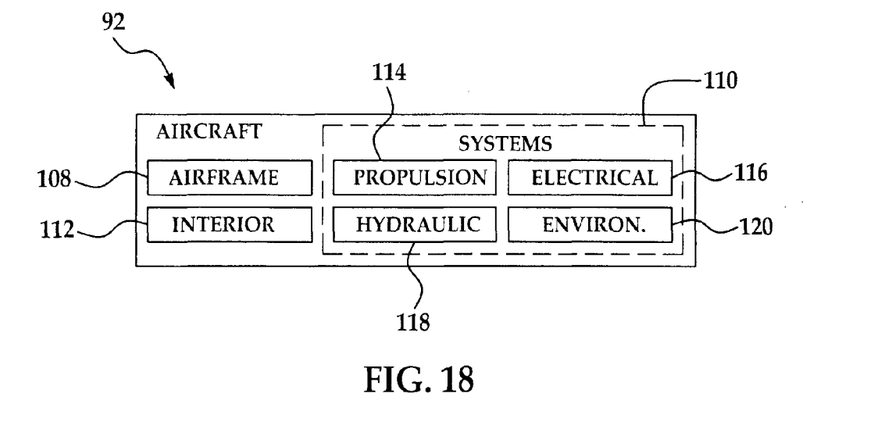
FIG. 18 is a block diagram of an aircraft.

Embodiments of the disclosure may find use in a variety of potential applications, particularly in the transportation industry, including for example, aerospace, marine and automotive applications. Thus, referring now to FIGS. 17 and 18, embodiments of the disclosure may be used in the context of an aircraft manufacturing and service method 90 as shown in FIG. 17 and an aircraft 92 as shown in FIG. 18. During pre-production, exemplary method 90 may include specification and design 94 of the aircraft 92 and material procurement 96. During production, component and subassembly manufacturing 98 and system integration 100 of the aircraft 92 takes place. Thereafter, the aircraft 92 may go through certification and delivery 102 in order to be placed in service 104. While in service by a customer, the aircraft 92 is scheduled for routine maintenance and service 106 (which may also include modification, reconfiguration, refurbishment, and so on).

Each of the processes of method 90 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 18, the aircraft 92 produced by exemplary method 90 may include an airframe 108 with a plurality of systems 110 and an interior 112. Examples of high-level systems 110 include one or more of a propulsion system 114, an electrical system 116, a hydraulic system 118, and an environmental system 120. Any number of other systems may be included. Although an aerospace example is shown, the principles of the disclosure may be applied to other industries, such as the marine and automotive industries.

Systems and methods embodied herein may be employed during any one or more of the stages of the production and service method 90. For example, components or subassemblies corresponding to production process 98 may be fabricated or manufactured in a manner similar to components or subassemblies produced while the aircraft 92 is in service. Also, one or more apparatus embodiments, method embodiments, or a combination thereof may be utilized during the production stages 98 and 100, for example, by substantially expediting assembly of or reducing the cost of an aircraft 92. Similarly, one or more of apparatus embodiments, method embodiments, or a combination thereof may be utilized while the aircraft 92 is in service, for example and without limitation, to maintenance and service 106.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of fabricating a composite stiffener, comprising:
    forming a pair of composite channels each having a flange and a radius portion using composite fiber tape having only unidirectional reinforcing fibers, the composite fiber tape placed over a tool;
    placing a layer of composite fiber fabric on the radius portion of each of the channels, said composite fiber fabric comprising fibers transversely oriented with respect to one another and with respect to said unidirectional reinforcing fibers comprising said channels;
    forming a base using additional composite fiber tape;
    placing a layer of said composite fiber fabric on at least a portion of the base;
    placing a layer of adhesive on and around an outer surface of a filler while said outer surface is not in contact with the channels and the base, said adhesive only on said outer surface and not within said filler;
    assembling the channels and the base following placing said layer of adhesive;
    placing the filler and the layer of adhesive in a radius filler zone between the radius portions of the channels and the base; and,
    curing the assembly to form the composite stiffener.

2. The method of claim 1, wherein the forming of the channels and the base each includes laying up multiple plies of said composite tape.

3. The method of claim 1, wherein placing the adhesive layer around the filler is performed by wrapping the filler with a sheet of adhesive.

4. The method of claim 1, further comprising:
    placing a layer of said composite fiber fabric on sections of each of the channels and the base outside the radius filler zone; and,
    introducing a layer of adhesive between the layers of said composite fiber fabric on the sections outside the radius filler zone.

5. The method of claim 1, wherein the composite stiffener comprises a C-shaped cross-section.

6. The method of claim 1, wherein the composite stiffener comprises an I-shaped cross-section.

7. The method of claim 1, wherein the step of forming multi-play lay-ups further comprises forming a first multi-ply lay up on a first tool and forming a second multi-ply lay-up on a second tool.

8. The method of claim 7, further comprising moving the first tool and the second tool proximate to each other so as to form an I-shaped cross section.

9. The method of claim 1, wherein the multi-ply lay-ups comprise carbon fibers.

10. A method of fabricating a reinforced composite stiffener, comprising:
    forming a composite structure having a web and a pair of flanges extending in opposite directions from the web, including forming multi-ply lay-ups of only unidirectional fiber composite tape on a tool and placing a layer of composite fiber fabric on a radius portion between one of the flanges and one of the webs, said composite fiber fabric comprising fibers transversely oriented with respect to one another and with respect to said unidirectional reinforcing fibers comprising said channels,
    placing an adhesive around and on an outer surface of the filler for joining the reinforcing filler to the composite fabric layers on the composite structure and a cap, said adhesive only on said outer surface and not within said filler, said placing an adhesive following formation of said filler while said outer surface is not in contact with the web and the cap and prior to assembling said cap;
    placing the reinforcing filler in a radius filler zone;
    applying a second layer of said composite fabric on a surface of the cap; and
    joining the surface of the cap to the flanges.

11. The method of claim 10, wherein:
    forming the composite structure includes forming the laminated tape plies into first and second channels, and
    applying a layer of said composite fabric on an outer surface of the laminated composite tape plies includes placing patches of the composite fabric on selected areas of the first and second channels.

12. The method of claim 11, further comprising:
    placing a layer of said composite fabric on facing surfaces of the each of the first and second channels; and,
    joining the first and second channels together at the facing surfaces.

13. A method of fabricating a reinforced composite stiffener for aircraft applications, comprising:
    forming multi-ply lay-ups of unidirectional fiber composite tape on a tool;
    forming the lay-ups into first and second C-channels, a cap and a base;
    assembling the C-channels, the cap and the base into an I-section structure having a web and a pair of flanges on each end of the web;
    applying composite fabric on outer surfaces of the C-channels, the cap and the base in areas forming radius filler zones at the intersection of the web with the cap and with the cap and with the base, said composite fabric comprising fibers transversely oriented with respect to one another and with respect to fibers comprising said C-channels;
    wrapping a structural adhesive around and on an outer surface of a reinforcing filler following formation of said filler while said outer surface is not in contact with the web and the base and prior to assembling said cap and said base, said adhesive only on said outer surface and not within said filler;
    placing the reinforcing filler and the adhesive in the radius filler zone following assembling said cap and said base; and
    curing the assembly to form the composite stiffener.

14. The method of claim 13, wherein the step of forming multi-play lay-ups further comprises forming a first multi-ply lay up on a first tool and forming a second multi-ply lay-up on a second tool.

15. The method of claim 14, further comprising moving the first tool and the second tool proximate to each other so as to form an I-shaped cross section.

* * * * *